(No Model.)
S. J. ADAMS.
TUBE WELDING BALL.
No. 361,568. Patented Apr. 19, 1887.
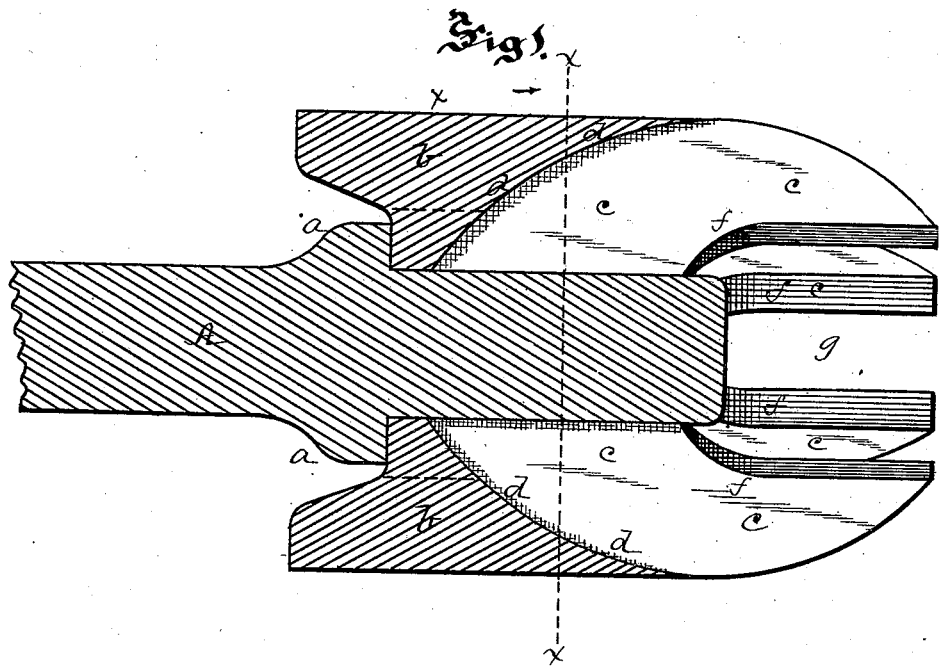
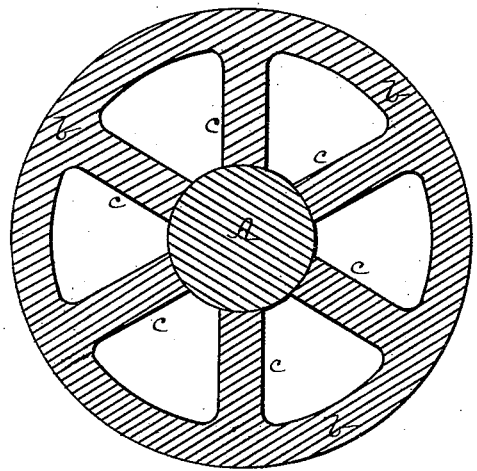
Witnesses:
J. T. Cooke
T. E. Barnes
Inventor.
S. Jarvis Adams
By James I. Kay
Attorney

United States Patent Office.

S. JARVIS ADAMS, OF PITTSBURG, PENNSYLVANIA.

TUBE-WELDING BALL.

SPECIFICATION forming part of Letters Patent No. 361,568, dated April 19, 1887.

Application filed November 15, 1886. Serial No. 218,877. (No model.)

*To all whom it may concern:*

Be it known that I, S. JARVIS ADAMS, of Pittsburg, in the county of Allegheny and State of Pennsylvania, have invented a new and useful Improvement in Tube-Welding Balls; and I do hereby declare the following to be a full, clear, and exact description thereof.

My invention relates to pipe or tube welding balls, its object being to provide an inexpensive tube-welding ball for the manufacture of medium-size pipe, and at the same time to form a ball which can be made without the employment of expensive cores, and one which has a sufficient body of metal at the point of welding to support the welding-pressure and prevent the melting and cutting of the ball, and yet is light in weight, and therefore easily handled and cheap, my invention having special reference to that class of balls which are described and claimed broadly in the application of even date herewith, Serial No. 218,874.

My improved ball, forming the subject of the present application, is provided with a series of separate light ribs integral with and extending beyond the body thereof to form the point or tapering forward end, these ribs resting on the supporting-rod to support the forward end of the ball. These separate light ribs also extend within the solid portion or body of the ball, so as to support the same, except just at the point where the welding operation takes place, at which point the ball is made thick and strong to support such strain, while by the employment of the light ribs extending within the ball a much lighter and consequently cheaper welding-ball is formed, and by the employment of the separate ribs the ball can be made without the employment of expensive cores in forming the mold in which it is cast.

To enable others skilled in the art to make and use my improved welding-ball, I will describe the same more fully, referring to the accompanying drawings, in which—

Figure 1 is a longitudinal section illustrating the same, and Fig. 2 is a cross-section on the line $x\ x$, Fig. 1.

In the accompanying drawings, A represents the supporting-rod, this rod having the shoulder or enlargement $a$ to sustain the back-pressure of the ball.

The welding-ball B is formed of cast metal and in a single piece, and it has the body $b$ and the series of separate light ribs, $c$, integral with the body, and extending forward from the same to form the point or tapering forward end of the ball, by means of which the skelp is directed onto the welding portion $b$. The welding portion of the ball is formed thick and strong at the exact point, $x$, where the welding operation takes place, in smaller balls the solid metal extending down from the outer face to the supporting-rod, but in large balls suitable heavy supporting-lugs extending down from the thick body to the supporting-rod to sustain the severe end-pressure, as shown in Letters Patent No. 214,534, granted to Andrew Telfer and William Collins, April 22, 1879, and as indicated by dotted lines in the drawings. The light ribs $c$, however, extend back under the body $b$, so as to support the body, except at the exact point of weld, the inner walls of the body being outwardly flaring, as shown at $d$, and that portion of the ball being supported by the ribs $c$ where they extend under the body. The ribs $c$, as is clearly shown in Fig. 2, fit around and have a bearing on the supporting-rod A, and so act to support the ball, except at the point of weld, and to brace the forward portion of the ball and hold it in proper position; and in order to further lighten the ball these points are cut away beyond the point where they bear on the rod, as at $f$, thus forming a large mouth, $g$, to the ball, into which any slag or scale in the interior of the tube-skelp can enter, the scale being thus prevented from passing between the ball and the tube-skelp, and by the pressure of the rolls on the tube-skelp being forced into the metal thereof. As thus formed the ball is provided with sufficient strength to support the welding strain and of sufficient thickness to prevent the melting and cutting of the same by the skelp, and at the same time it provides the lightest form known to me of a single ball for welding medium-sized tubing, the ball having the necessary thickness of metal at the point of weld, but being formed with a skeleton body beyond the same.

As the interior walls or faces of the body of the ball and the ribs are all of them straight or tapering in such manner that the pattern will draw out of the mold, the mold can be formed without requiring the use of a separate core or cores to form the interior cavity of the ball, and the expense of forming the ball can be largely reduced, as all such cores are expensive, this being fully set forth in the application for patent before referred to.

What I claim as my invention, and desire to secure by Letters Patent, is—

1. A pipe-welding ball provided with a series of ribs integral with and extending beyond the body thereof to form the point or tapering forward end, these ribs resting on the supporting-rod to support the forward end of the ball, substantially as set forth.

2. A pipe-welding ball provided with a thick body at the point of weld, and a series of ribs integral with the body and forming the point of the ball, said ribs extending within the solid portion or body of the ball, except just at the welding-point, substantially as and for the purposes set forth.

3. The pipe-welding ball herein shown and described, having the body $b$, provided with outwardly-flaring inner walls, $d$, and series of separate ribs, $c$, integral with and extending out from the body within the ball and resting on the supporting-rod, substantially as and for the purposes set forth.

4. The pipe-welding ball herein shown and described, having the body $b$, provided with the outwardly-flaring inner walls, $d$, and series of separate ribs, $c$, integral with and extending out from the body and resting on the supporting-rod, said ribs being cut away, as at $f$, to form the large open mouth $g$, substantially as and for the purposes set forth.

In testimony whereof I, the said S. JARVIS ADAMS, have hereunto set my hand.

S. JARVIS ADAMS.

Witnesses:
JAMES I. KAY,
J. N. COOKE.